United States Patent [19]

Delgendre et al.

[11] 3,865,037

[45] Feb. 11, 1975

[54] PYROTECHNICAL COMPOSITION STATIC RELAYS

[75] Inventors: Jacques Claude Delgendre, Toulon; Alain Roger Kerreneur, Paris; Georges Albert Berton, Toulon, all of France

[73] Assignee: Etat Francaise Delegation Ministerielle pour L'Armement, Paris, France

[22] Filed: May 26, 1972

[21] Appl. No.: 257,197

[30] Foreign Application Priority Data

May 26, 1971 France .............................. 71.18979

[52] U.S. Cl........... 102/70.2 R, 102/28 R, 337/412, 337/416

[51] Int. Cl. .......................................... H01h 37/76

[58] Field of Search ........... 337/401, 412, 413, 416; 102/28, 70.2

[56] References Cited

UNITED STATES PATENTS

| | | | |
|---|---|---|---|
| 2,725,821 | 12/1955 | Coleman | 102/28 X |
| 2,786,918 | 3/1957 | Rosenberg | 337/416 X |
| 3,102,476 | 9/1963 | Naeseth | 102/16 X |

*Primary Examiner*—Verlin R. Pendegrass
*Attorney, Agent, or Firm*—Stevens, Davis, Miller & Mosher

[57] ABSTRACT

A static electrical relay comprising first and second thermally coupled elements of pyrotechnical composition. The first element is initially electrically insulating and becomes conductive upon exposure to heat generated by the reaction of the second element when the second element is electrically exciting by energizing a heater wire embedded therein. Spaced electrodes in the first element, which are initially electrically insulated become electrically connected after exposure of the first element to the heat generated by the second element. A pulse counting circuit is also disclosed employing a plurality of static electrical relays in accordance with the invention.

3 Claims, 4 Drawing Figures

PATENTED FEB 11 1975 3,865,037

SHEET 2 OF 2

PYROTECHNICAL COMPOSITION STATIC RELAYS

BACKGROUND OF THE INVENTION

This invention relates to static relays, the operation of which is based on the reacted effect of pyrotechnical compositions.

Currently known static relays utilize, as operating elements, either semi-conductor components or magnetic circuits in the case of high power ratings. The advantages of such relays are widely recognized; low response time, miniaturization, flexibility of application and a high degree of reliability under normal conditions of operation. However, they suffer from the drawback of poor resistance to certain extreme environmental conditions such as very high temperature and high intensity electromagnetic or radioactive radiation.

The relay which is the object of this invention, overcomes this drawback due to its very high resistance to extreme environmental conditions. It also allows for the same power ratings, a higher degree of miniaturization than magnetic-circuit relays.

Another characteristic is that the relay, according to this invention, differs from current pyrotechnical relays in that it is free of moving parts and consequently warrants description as a "static" relay.

SUMMARY OF THE INVENTION

This invention comprises a relay which closes a circuit by deposition of a conductive body in the circuit, the conductive body being produced by the reaction of a pyrotechnical composition.

This reaction can be obtained by various means such as an electrical control circuit and, in particular, through the operation of a conventional electrically-activated pyrotechnical device.

Another object of the invention is the combination of several basic relays in order to achieve various logic functions and in particular electrical-pulse counting devices.

A further object of the invention is the production of combinations of said relays in the form of printed-circuit cards similar to the printed-circuit cards currently used in electronics and utilizable, with such cards, in a common equipment.

DESCRIPTION OF THE PREFERRED EMBODIMENTS

Figure 1:
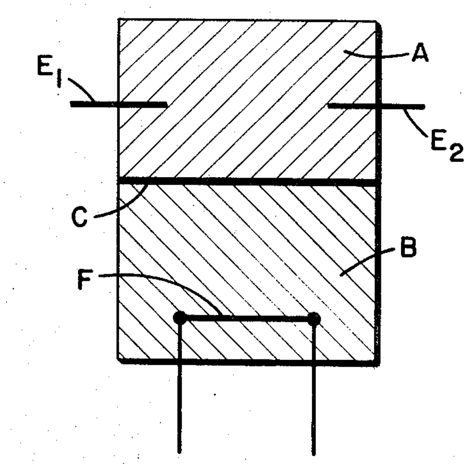
FIG. 1 illustrates a relay specifically designed for discrete applications and relatively high power ratings.

Referring to FIG. 1, element A, which is insulating before operation, is of a pyrotechnical composition which produces, after reaction, a conductive body providing a contact medium between two electrodes $E_1$ and $E_2$. This can be achieved, for example, by using the reaction of boron with silver difluoride:

$$2\ B + 3\ Ag\ F_2 \longrightarrow 2\ BF_3 + 3\ Ag$$

where $BF_3$ is released in gas form, leaving a film of conducting silver between electrodes $E_1$ and $E_2$.

Element B is of a conventional pyrotechnical composition (e.g., metal-oxidant) which releases sufficient heat through a combustible partition C to initiate the reaction of element A. The reaction of element B is initiated in equally conventional manner by a heater wire F connected in the control circuit of the relay. The reaction products of element B are insulating and the wire is normally cut off after operation, thereby causing the opening of the control circuit unless provisions are made to maintain the control circuit in its closed condition.

Figure 3:
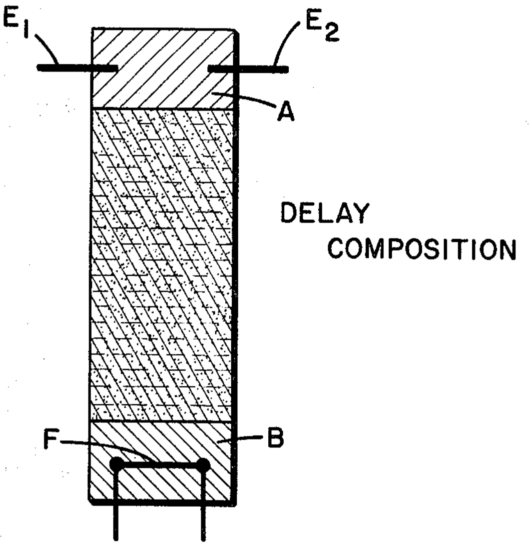
FIG. 3 illustrates a relay with an inserted pyrotechnical delay.

If it is required that the operation of element A be delayed with respect to initiation of element B, a pyrotechnical delay of the type used in T-type fuses may be inserted between the two elements, as illustrated by FIG. 3.

Figure 2:
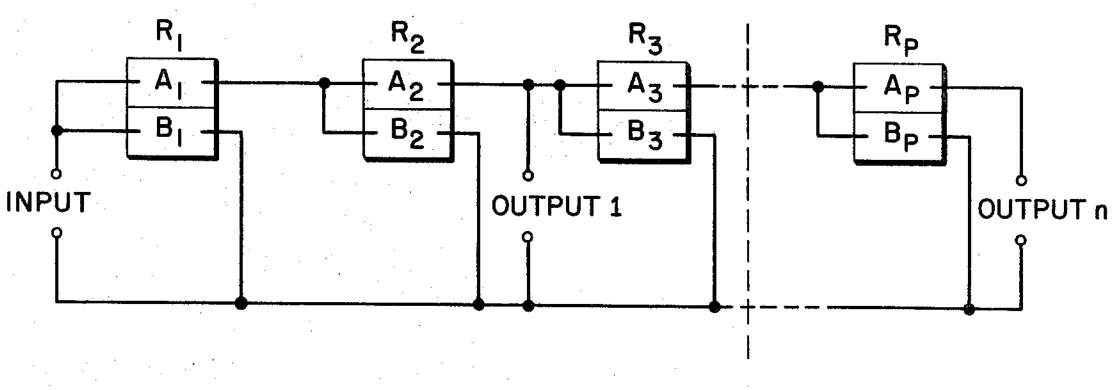
FIG. 2 illustrates a block diagram of a pulse counting scale employing a number of relays of the type shown in FIG. 1.

FIG. 2 illustrates the block diagram of a pulse counting scale obtained by using a number of relays, on the basis of one relay per pulse to be counted. For this application, which entails a degree of miniaturization, the heater wire F A be eliminated by using, for element B, a conducting composition having insulation reaction products, reaction time A each.

Figure 4:
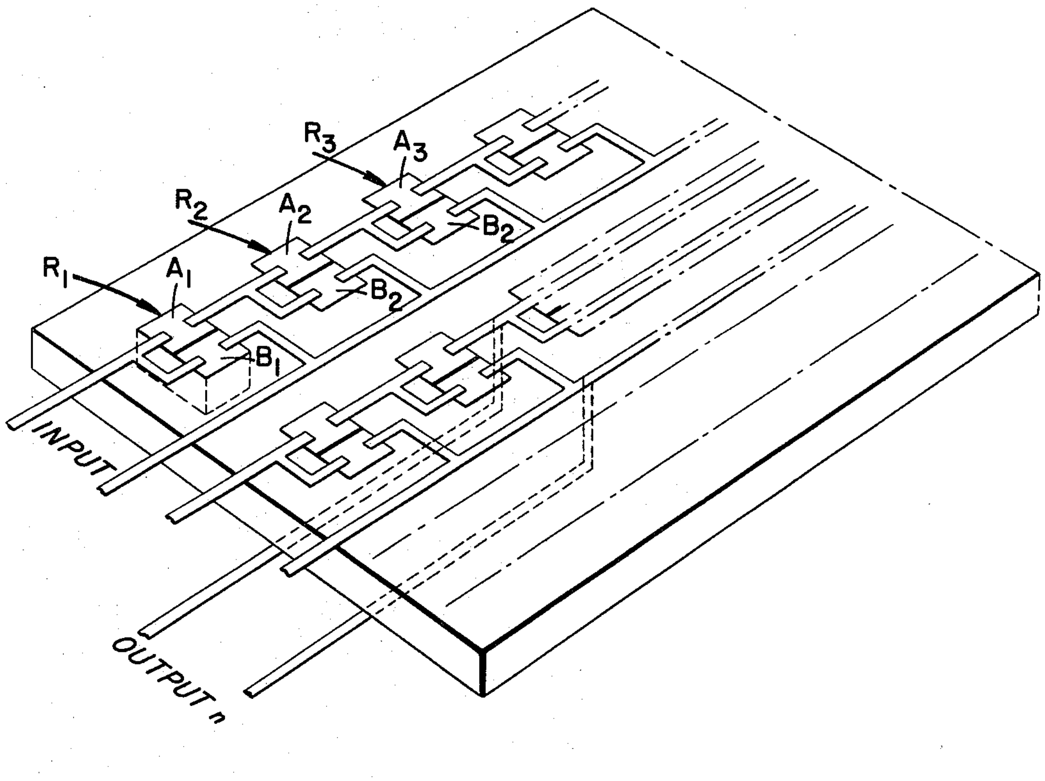
FIG. 4 illustrates a pulse counting scale produced in the form of printed-circuit card.

Characteristically, the assembly can be produced in the form of printed-circuit cards, the pyrotechnical compositions occupying cavities etched into the card, as illustrated by FIG. 4.

The sequence of operation is as follows: an initial pulse is applied to the input terminals causing element $B_1$ of relay $R_1$ to release sufficient heat to initiate the reaction of element $A_1$. Consequently, element $a_1$ becomes a conductor and element $B_1$ an insulator, the pulse duration being selected so as to be less than the reactiontime of $B_1$. A second pulse applied across the input terminals is coupled directly to relay $R_2$ which is connected to the input via element $A_1$ of relay $R_1$ which is now conducting without being shunted by element $B_1$ of relay $R_1$ which is now insulating. Element $B_2$ of relay $R_2$ releases sufficient heat to initiate the reaction of element $A_2$ making element $a_2$ conductive and element $B_2$ an insulator. Consequently, wach new pulse initiates the operation of the succeeding relay.

The device is also provided with output terminals enabling application of pulses to load circuits, each load circuit being energized after application of a number of pulses equal to the number of relays preceding the corresponding output.

This invention has a wide range of applications in all cases requiring high resistance to extreme environmental conditions, assuming one-time non-repetitive action. Typical applications would be in sequential devices, either automatic or controlled by time base equipping weapons systems or space rockets.

What is claimed is:

1. A pulse counting circuit comprising a plurality of static electrical relays, each of said relays comprising
   - a first element having first and second spaced electrodes therein, said first element being initially insulating and becoming conductive upon exposure to heat;
   - a second element coupled to said first element, said second element having a pyrotechnical composition;
   - electrically excited means having third and fourth terminals for initiating the reaction of said second element to produce sufficient heat to cause said first element to become conductive, said first and second spaced electrodes being insulated from each other by said first element prior to initiating the reaction of said second element and being electrically connected after exposure of said first element to the heat generated by said second element;

means for coupling an input pulse across the third and fourth terminals of the electrical exciting means of a first of said plurality of relays and to the first electrode of the first element of said relay, means coupling the second electrode of the second element of each of said relays to the first electrode and third terminal of a succeeding relay, means coupling the fourth terminal of each succeeding relay to the fourth terminal of the preceding relay, and means for obtaining an output voltage between the second electrode and fourth terminal of each of said plurality of relays.

2. A pulse counting circuit as defined by claim 1 wherein each of said relays is in the form of a printed circuit card.

3. A pulse counting circuit as defined by claim 1 wherein the first element of each of said relays is comprised of boron and silver difluoride.

* * * * *